United States Patent [19]

Luczak

[11] Patent Number: 4,513,094
[45] Date of Patent: Apr. 23, 1985

[54] SINGLE-BATCH PROCESS TO PREPARE NOBLE METAL VANADIUM ALLOY CATALYST ON A CARBON BASED SUPPORT

[75] Inventor: Francis J. Luczak, Glastonbury, Conn.

[73] Assignee: United Technologies Corporation, Hartford, Conn.

[21] Appl. No.: 506,469

[22] Filed: Jun. 20, 1983

[51] Int. Cl.³ .......................... B01J 21/18; B01J 23/64
[52] U.S. Cl. ...................................... 502/101; 502/185
[58] Field of Search ................................ 502/101, 185

[56] References Cited

U.S. PATENT DOCUMENTS

| 4,136,059 | 1/1979 | Jalan et al. | 502/101 |
| 4,202,934 | 5/1980 | Jalan | 502/185 X |
| 4,316,944 | 2/1982 | Landsman et al. | 502/101 |

*Primary Examiner*—Patrick Garvin
*Attorney, Agent, or Firm*—Alan C. Cohen

[57] ABSTRACT

A novel single-batch method for preparing carbon supported alloy catalysts, wherein one of the metals is a noble metal, preferably platinum and the other metals selected from the transition Groups IV, V, VI or VII. The process comprises sequentially adsorbing the metallic components onto the carbon support. The adsorption takes place in an aqueous medium and the metal components are introduced in the ionic form. The catalyst is finally formed by heating to an elevated temperature.

7 Claims, 2 Drawing Figures

SINGLE-BATCH PROCESS TO PREPARE NOBLE METAL VANADIUM ALLOY CATALYST ON A CARBON BASED SUPPORT

DESCRIPTION

1. Technical Field

The present invention relates to noble metal carbon supported alloy catalysts for use in fuel cell electrodes and other catalytic structures and a method of producing such catalysts.

2. Background Art

A fuel cell is an electrochemical device in which the energy from a chemical reaction is converted to direct current electricity. The basic concept, which was described by Sir William Grove about 1840, comprises an anode and a cathode separated by an electrolyte.

During operation a continuous flow of fuel, commonly hydrogen, is fed to the anode while, simultaneously, a continuous flow of oxidant, commonly air, is fed to the cathode. The fuel is oxidized at the anode with a release of electrons through the agency of a catalyst. These electrons are then conducted to the cathode through wires external to the cell, where the oxidant is reduced and the electrons are consumed, again through the agency of a catalyst. The constant flow of electrons from the anode to the cathode constitutes an electrical current which can be made to do useful work.

The efficiency at which the cell operates is determined by several parameters, not the least of which is the activity of the cathode catalyst. This activity is measured by the rate at which the electrochemical reduction of the oxidant proceeds on the surface of the catalyst in the presence of the electrolyte at a specified temperature and electrochemical potential. There have been many attempts over the years to find inexpensive, highly active catalysts, and processes for making them. However, the choice of materials is severely limited since any catalyst which is developed for this purpose must not only have a high activity for the electrochemical reduction of oxygen, but must be capable of withstanding a working environment of relatively high temperatures while being exposed to a strong acid.

Initially, catalysts were made of platinum or other noble metals, as these materials were best able to withstand the corrosive environment of the electrochemical cell. Later, these noble metals were dispersed over the surface of electrically conductive supports (e.g. carbon black) to increase the surface area of the catalyst which in turn increased the number of reactive sites, thereby leading to improved efficiency of the cell. It was then discovered that certain alloys of noble metals exhibited increased catalytic activity, further increasing fuel cell efficiencies.

Some of these alloys are platinum-chromium (commonly assigned U.S. Pat. No. 4,316,944) and platinum-vanadium (commonly assigned U.S. Pat. No. 4,202,934). These increases in fuel cell efficiency coupled with the increase in cost of other energy sources contributes to even greater utilization of the fuel cell.

However, the standard processes for producing these binary and recently discovered ternary alloy catalysts, (commonly assigned, copending U.S. patent application Ser. No. 459,002) are relatively time consuming, expensive, multi-batch procedures. As an example, the current practice in preparing a multielement carbon supported catalyst is to first prepare the carbon substrate and then adsorb the platinum or noble metal onto the support. This is followed by a drying, sifting and mild heat treatment to form the noble metal-carbon black supported catalyst. Once the noble metal-carbon black supported catalyst is prepared, it is then dispersed in water and the second metal component is adsorbed onto it and again it is dried, sifted and heat treated to form the alloy catalyst.

Catalysts made using this technique have high surface areas and high activity. However, the redundant steps of drying, sifting and heating adds extra cost to the production of such catalysts. Additionally, the metallic components of the catalysts formed with this method have a tendency to cluster together forming large crystallites. The size of the crystallites formed using these prior art methods are larger than about 50 Å. The resulting poor dispersion of the catalyst leads to a less active, less efficient catalyst.

Therefore, what is needed in the art is a simpler, less complex method for producing multi-element, carbon-supported catalysts with improved dispersion of the reactive sites on the support.

DISCLOSURE OF INVENTION

The present invention is directed to a method of making a noble metal binary alloy carbon supported catalyst. The method comprises adsorbing the noble metal onto the support particles and subsequently adsorbing an alloying metal component, selected from the transition Groups IV, V, VI or VII, onto the support particles in a single solution, drying, sifting and heating the particles to form the catalyst. The process produces catalysts with more uniform distribution of the metallic components on the support as well as smaller reactive sites, which in turn, leads to higher catalyst activity.

Another benefit is a reduction in catalyst sintering because of the very good initial dispersion of the catalyst. One common decay mode of catalysts is the growth in crystallite size (decreased reactive surface area). A benefit of this catalyst preparation is the reduction in crystallite clustering. These crystallite clusters tend to sinter into larger crystallites faster than the highly dispersed catalysts formed using the present method. One reason why this is so, is the fact that the crystallites formed using this method are considerably smaller ($\approx 45$ Å) compared to those formed using the two-batch method ($\approx 60$ Å).

The foregoing and other features and advantages of the present invention will become more apparent in light of the following description and accompanying drawings.

BEST MODE FOR CARRYING OUT THE INVENTION

Figure 1:
FIG. 1 is a photomicrograph showing the Pt-V alloy dispersed on the support using the two-batch, prior art method. The relatively large crystallite clusters and their poor dispersion on the support material may be clearly seen.

The method of producing these noble metal, binary alloy, carbon-supported catalysts comprises the following basic procedure.

Prepare an aqueous dispersion of the carbon support particles, and blend or agitate the dispersion to wet the particles and uniformly distribute them. The preferred means of blending is with the use of an ultrasonic blender, however, other techniques may be used.

While the dispersion is blending, the noble metal constituent is added in the form of a noble metal salt, i.e. chloroplatinic acid, etc. The noble metal ions are then brought into intimate contact with the carbon support by constant stirring, while the dispersion is heated to approximately 45° C. (113° F.).

An aqueous solution containing sulfur ions is prepared and then added to the dispersion while stirring and heating continues. It is believed that almost any aqueous soluble sulfur compound can be used, however, sodium dithionite is the preferred compound.

Although it is not completely understood, the sulfur solution probably promotes a noble-metal sulfide deposition on the support carbon, which when reduced leads to very small crystallites.

An aqueous solution of the selected alloying metal ions is then prepared. In general, it has been found that the ammonium salts of the alloying metal such as ammonium meta-tungstate or ammonium metavanadate, work quite well, but need not be limited to salts of this type. This solution containing the alloying metal ions, is then added to the dispersion and the pH is adjusted to about 5.5 with the appropriate amount of acid or alkali, i.e. HCl or $NH_4OH$. These metal ions are given time (about 2 hours) to intimately contact the support particles and adsorb onto them. It should be noted that throughout this preparation, the dispersion is constantly stirred and the temperature is maintained at approximately 35°–55° C., preferably 45° C. (113° F.).

After the alloying metal ions have been adsorbed onto the support particles, the treated particles are removed from the aqueous dispersion, dried, sifted through a fine mesh screen and heat treated at about 927° C. (1700° F.) under flowing nitrogen or carbon monoxide for about 15 minutes to about 1 hour to form the catalyst.

Although the method has been described for making binary alloy catalysts, there is no reason to believe that by sequentially introducing solutions containing other metal ions and adsorbing them onto the support particles, that ternary, quaternary etc. alloy catalysts cannot be formed with this method. In addition to vanadium, which is used in the Examples below, the alloying metals may be selected from the transition Groups IV, V, VI and VII in the periodic table, (V, Cr, Mo, W, Zr, Ti, Mn).

EXAMPLE I

A platinum-vanadium alloy catalyst of high surface area supported on carbon was prepared using the disclosed single-batch method as follows:

Five grams of commercially available acetylene black carbon (Gulf Oil Chemicals, Canada) support material was placed in 500 mls of $H_2O$ and ultrasonically blended for about 30 minutes to form a dispersion. A 10 ml aqueous solution containing 1.4 grams of chloroplatinic acid was added to the dispersion and ultrasonically blended for 10 minutes. The dispersion was then stirred and heated to 45° C. (113° F.). This temperature was maintained during the entire preparation, as well as the stirring. A separate solution containing 3 grams of $Na_2S_2O_4$ in 30 mls of $H_2O$ was prepared and stirred for 5 minutes and then this sodium dithionate ($Na_2S_2O_4$) solution was slowly added, along with 4.2 cc of 30% hydrogen peroxide ($H_2O_2$) to the Pt-carbon dispersion. Then a solution containing 0.5 gram of ammonium meta-vanadate in 30 ml of $H_2O$ was added to the dispersion and the pH of the dispersion was adjusted to between 5-6 with $NH_4OH$ or HCl. It is known that hydrogen peroxide will insure that the vanadium pentoxide is completely dissolved in the solution.

The dispersion was then stirred for 2 hours while the temperature was maintained at 45° C. (113° F.), forming the precatalyst by the adsorption of the Pt and V ions onto the carbon support particles. The precatalyst was then filtered, but not rinsed, dried and then sifted through an 80 mesh screen. It was then heat-treated at 927° C. (1700° F.) under nitrogen for 1 hour to form the catalyst.

EXAMPLE II

The precatalyst was prepared using Example I except that the final heat-treatment was performed in a carbon monoxide atmosphere. The catalysts formed in the carbon monoxide atmosphere have the benefit of being much more hydrophobic than catalysts formed in nitrogen.

In the following discussion and in the appended claims, whenever catalytic activity comparisons are made, they are comparisons of mass activity. In the present context, the mass activity of a cathode catalyst is defined as the maximum current obtained from the catalyst when fabricated into a gas diffusion electrode and operated at 0.9 volt in oxygen at one atmosphere pressure in 99% phosphoric acid at 190° C. (375° F.). The potential is measured relative to an unpolarized $H_2$/Pt reference electrode at the same pressure and temperature in the same electrolyte. Although the test electrode may contain less than 1 milligram of the catalyst, the current is normalized to what would be obtained from this amount of catalyst and the mass activity is expressed as milliamps per milligram of catalyst.

Figure 2:
FIG. 2 is a photomicrograph showing the Pt-V alloy more evenly dispersed on the support using the method of the present invention. The smaller crystallites formed with this method are also clearly shown.

The catalyst from Examples I and II were subjected to photomicrographic analysis to determine the uniformity of dispersion of the alloy reactive sites as well as the size of the reactive sites. These were then compared with similar analysis of Pt-V catalysts prepared using the two-batch method. In comparing FIG. 1 and FIG. 2, it is clear that the catalyst prepared using the present method (FIG. 2) contains a more uniform distribution of the alloy reactive sites 1 on the support 2. In addition, the clustering and the frequency of the large crystallites, which is apparent in the catalyst prepared using the two-batch method, is not found in the catalyst formed using the present method. Also the reactive sites formed using the present method are about 40–50 Å in size as opposed to about 65 Å in the two-batch catalyst. Both the uniform dispersion and the smaller size of the reactive sites on the support material are desirable effects in these catalysts and generally lead to better performance, stability and improved efficiency.

The catalysts made in Examples I and II were tested to determine their performance, compared to other Pt-V catalysts prepared from the prior art method. Cathodes were made from each of the alloys that had been prepared as described in the above Examples, and tested in subscale 2"×2" laboratory fuel cells. The cells were run and the voltage measured at a current density of 200 ASF (amps per square foot). All of the electrodes contained the same platinum loading, i.e. 0.5 mg of Pt/cm² electrode. Each of the catalyst's performance was evaluated at standard conditions, i.e. a cell current density of 200 ASF, 99% phosphoric acid electrolyte, 190° C. (375° F.) cell temperature with air as the reacting gas at a low utilization and with the voltage at the given current corrected to eliminate cell resistance (IR-free).

The data in the Table demonstrates that catalysts manufactured using the present single-batch process have comparable catalytic activity when compared to those prepared using the more costly two-batch technique. Catalysts 1 and 2 were prepared using the present single-batch method, while catalyst 3 was prepared using the double-batch method claimed in U.S. Pat. No. 4,202,934.

TABLE

| Supported Alloy Catalyst | Heat Treatment | O₂ Activity @ 0.9 volts mA/mg Pt | H₂/Air IR-Free Cell Voltage @ 375° F. @ 200 ASF (190.56° C.) |
| --- | --- | --- | --- |
| 1. Pt-V | N₂ | 34.9 | .721 |
| 2. Pt-V | CO | 34.4 | .705 |
| 3. Pt-V | N₂ | 33.0 | .720 |

It is clear from the data in the Table that the present single-batch method of preparing noble metal alloy, carbon-supported catalysts produces catalysts which are as effective as those prepared from the two-batch method. Therefore, with the use of this method effective catalysts can be prepared more economically and efficiently. In addition, the smaller reactive sites and more universal distribution of them on the support particles strongly suggest that catalysts formed using this method will be less subject to decay through crystallite growth; and thereby have longer life spans. In addition, the smaller reactive sites should give rise to catalysts with improved catalytic reactivity which can lead to more efficient fuel cell operation.

Having thus described my invention, that which I claim as new and desire to secure by Letters Patent of the United States is:

1. A method for making a finely divided platinum alloy catalyst supported on carbon for use in a fuel cell comprising:
   (a) preparing an aqueous dispersion of platinum ions and electrically conductive carbon support particles, heating the dispersion to about 45° C.,
   (b) preparing a sulfur ion containing aqueous solution,
   (c) adding the sulfur ion solution to the platinum dispersion and agitating while maintaining the dispersion at about 45° C.,
   (d) adsorbing the platinum onto the carbon support by intimately contacting the platinum with the support particles by agitating and maintaining the dispersion at about 45° C.,
   (e) preparing a second aqueous dispersion containing a salt of an element from transition Groups IV, V, VI or VII,
   (f) adding the second aqueous dispersion to the platinum dispersion while maintaining the dispersion at about 45° C. and adjusting the pH to about 5.5,
   (g) adsorbing the transition element onto the support particles by agitating while maintaining the dispersion at about 45° C.;
   (h) removing the treated support particles from the dispersion, drying, sifting and heating the particles to form the catalyst.

2. The method of claim 1 wherein the platinum ions are provided in the form of chloroplatinic acid.

3. The method of claim 1 wherein the sulfur ions are provided in the form of sodium dithionite.

4. The method of claim 1 wherein the transition element is vanadium.

5. The method of claim 4 wherein vanadium is provided in the form of ammonium meta-vanadate.

6. A platinum alloy carbon supported catalyst prepared by the process of claim 1.

7. The catalyst of claim 6 wherein the finely divided platinum alloy has an average particle size less than about 45 Å.

* * * * *